(12) United States Patent
Nakano et al.

(10) Patent No.: US 7,626,888 B2
(45) Date of Patent: Dec. 1, 2009

(54) ULTRASOUND SENSOR

(75) Inventors: Akio Nakano, Anjo (JP); Takeo Tsuzuki, Toyota (JP); Yoshihisa Sato, Nagoya (JP); Kiyonari Kojima, Nishikamo-gun (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 547 days.

(21) Appl. No.: 11/602,497

(22) Filed: Nov. 21, 2006

(65) Prior Publication Data

US 2007/0115102 A1   May 24, 2007

(30) Foreign Application Priority Data

Nov. 21, 2005 (JP) ............... 2005-336127

(51) Int. Cl.
*G01S 15/00* (2006.01)
(52) U.S. Cl. .................. 367/93; 73/514.34; 73/1.79; 340/904; 340/435; 293/117
(58) Field of Classification Search ........... 340/904, 340/435; 367/93; 293/117; 73/514.34, 1.79
See application file for complete search history.

(56) References Cited

U.S. PATENT DOCUMENTS 5,629,690 A    5/1997   Knoll 5,917,776 A * 6/1999 Foreman ............... 367/93
6,039,367 A * 3/2000 Muller et al. .......... 293/117
6,282,969 B1 * 9/2001 Daniel ................. 73/866.1
6,384,718 B1 * 5/2002 Nass et al. ............. 340/435

FOREIGN PATENT DOCUMENTS

| GB | 2272819 | 5/1994 |
| JP | 10-123236 | 5/1998 |
| JP | 2004-264221 | 9/2004 |
| JP | 2004-264264 | 9/2004 |

OTHER PUBLICATIONS

U.S. Appl. No. 11/492,925, filed Jul. 2006, Oda et al. (Corresponds to JP-2005-223294).

* cited by examiner

*Primary Examiner*—Albert K Wong
(74) *Attorney, Agent, or Firm*—Nixon & Vanderhye PC

(57) ABSTRACT

An ultrasound sensor for a vehicle has a housing which is fixedly arranged at a vehicle inner side of a periphery member of the vehicle, an ultrasound vibrator for sending and receiving ultrasound, and an ultrasound transferring member which is constructed of a different material from that of the housing to have an acoustic impedance with a medium value between an acoustic impedance of the ultrasound vibrator and that of the periphery member. The ultrasound vibrator is accommodated in the housing and fixed to an end portion of the housing, which faces the periphery member. The ultrasound transferring member is arranged at the end portion of the housing, and contacts both the ultrasound vibrator and the periphery member of the vehicle.

13 Claims, 2 Drawing Sheets

ULTRASOUND SENSOR

CROSS REFERENCE TO RELATED APPLICATION

This application is based on Japanese Patent Application No. 2005-336127 filed on Nov. 21, 2005, the disclosure of which is incorporated herein by reference.

FIELD OF THE INVENTION

The present invention relates to an ultrasound sensor, which can be suitably used for a vehicle, for example.

BACKGROUND OF THE INVENTION

A vehicle can be provided with an ultrasound sensor for detecting an obstacle around the vehicle. For example, as disclosed in JP-2004-264264A, a bumper of the vehicle is provided with a hole, through which the head portion of the ultrasound sensor is exposed to the exterior in such a manner that the outer surface of the head portion is arranged at the same surface with the outer surface of the bumper. In this case, the appearance of the vehicle is impaired because the head portion of the ultrasound sensor is exposed to the exterior of the vehicle.

In order to solve this problem, as disclosed in JP-10-123236A, a concave portion is arranged at the back side (inner side) of the bumper of the vehicle. A sensor of an ultrasound vibration type is housed in the concave portion to be invisible from the exterior of the vehicle. Thus, the appearance of the vehicle is maintained.

In this case, the ultrasound sensor (ultrasound-vibration-type sensor) has an ultrasound vibrator, which is made of a ceramic and fixed to a metal base. The ultrasound sensor is directly mounted to the concave portion formed at the back surface of the vehicle bumper.

Therefore, the ultrasound sensor is exposed to the environmental air, although the ultrasound sensor is arranged at the vehicle inner side of the vehicle bumper. Especially, there will occur corrosion at the metal base and wiring cords and the like of the ultrasound sensor. Accordingly, it is desirable to accommodate the ultrasound senor in a casing (housing) so as to protect the ultrasound sensor from the environmental air, and to attach the ultrasound sensor to the back surface of the vehicle bumper.

However, in the case where the ultrasound sensor is accommodated in the casing, the ultrasound will be transferred through the casing and the vehicle bumper when the ultrasound vibrator sends/receives the ultrasound. Thus, the ultrasound is transferred to a relatively broad region of the vehicle bumper, through the case.

In the case where the ultrasound is transferred to the relatively broad region of the vehicle bumper, the vibration at the different positions (e.g., middle portion and periphery portion of the region) will be canceled out and/or interfer due to different phases of vibration occurring at the different positions. Therefore, when ultrasound generated by the ultrasound vibrator is transferred to the vehicle bumper through the casing, directivity of the ultrasound sensor is narrowly limited and becomes irregular.

SUMMARY OF THE INVENTION

In view of the above-described disadvantages, it is an object of the present invention to provide an ultrasound sensor which has an ultrasound vibrator accommodated in a casing. The ultrasound sensor can have a satisfactory directivity even when being attached to a vehicle inner side of a periphery member of a vehicle, for example.

According to the present invention, an ultrasound sensor for a vehicle has a housing which is fixedly arranged at a vehicle inner side of a periphery member of the vehicle, an ultrasound vibrator for sending and receiving ultrasound, and an ultrasound transferring member which is constructed of a different material from that of the housing to have an acoustic impedance with a medium value between an acoustic impedance of the ultrasound vibrator and that of the periphery member. The ultrasound vibrator is accommodated in the housing and fixed to an end portion of the housing, which faces the periphery member. The ultrasound transferring member is arranged at the end portion of the housing and contacts both the ultrasound vibrator and the periphery member of the vehicle. The ultrasound is sent and received through the ultrasound transferring member and the periphery member of the vehicle.

Because the end portion of the housing is provided with the ultrasound transferring member having the acoustic impedance which can be set at a predetermined value, ultrasound reflections between the ultrasound vibrator and the ultrasound transferring member and ultrasound reflections between the ultrasound transferring member and the vehicle periphery member can be reduced. Therefore, the ultrasound transfer can be increased.

Generally, because stiffness and the like of the housing are to be maintained for fixing the ultrasound vibrator and for mounting the housing to the vehicle periphery member, it is difficult to provide the housing with material having optimal characteristics for transferring ultrasound. Therefore, the ultrasound transfer at the end portion of the housing is smaller than that at the ultrasound transferring member. Accordingly, the main transfer range of ultrasound can be concentrated at the ultrasound transferring member. Therefore, the vibration region of the vehicle periphery member can be reduced. Thus, directivity of the ultrasound sensor can be restricted from becoming irregular and excessively narrow.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

An ultrasound sensor 100 according to a first embodiment of the present invention will be described with reference to FIGS. 1 and 2B. The ultrasound sensor 100 can be suitably used in an obstacle detection device for detecting an obstacle around a vehicle or the like. In this case, the ultrasound sensors 100 can be mounted to an inner surface (i.e., surface of inner side of vehicle) of a periphery member (e.g., bumper 11) of the vehicle. For example, the ultrasound sensors 100 can be positioned at four corners of the vehicle.

Figure 1:
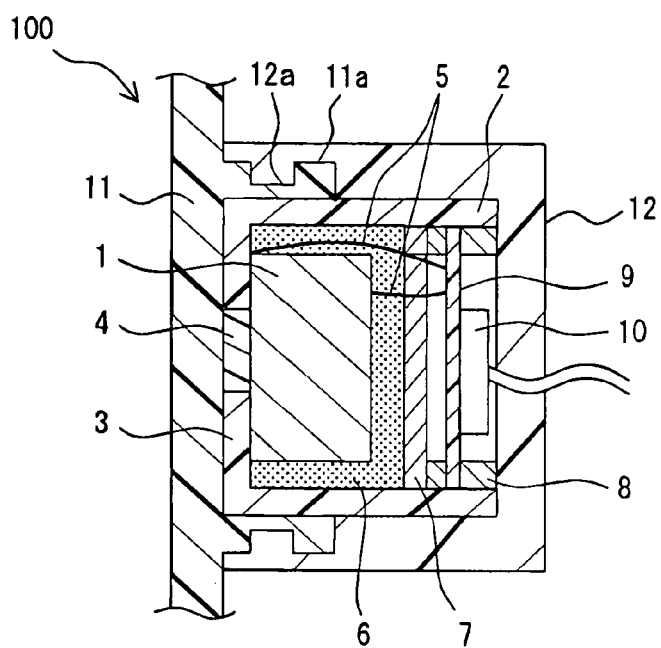
FIG. 1 is a partially sectional view showing a construction of an ultrasound sensor which is mounted to a vehicle bumper according to a first embodiment of the present invention.

FIG. 1 shows the ultrasound sensor 100 which is attached to the vehicle to contact the back surface (i.e., inner surface) of the bumper 11. The ultrasound sensor 100 has an ultrasound vibrator 1 (e.g., piezoelectric vibrator), an ultrasound transferring member 4, a circuit board 9 where a processing circuit is arranged, and a housing 2 which houses therein the piezoelectric vibrator 1 and the circuit board 9 and the like. The housing 2 is fixed to the bumper 11.

The housing 2 is made of, for example, a resin which can be strengthened by glass cloth to have a relatively high stiffness. The housing 2 is bottomed. The piezoelectric vibrator 1 is mounted to a bottom 3 (i.e., end portion) of the housing 2. The piezoelectric vibrator 1 can be made of a piezoelectric ceramic, which is constructed of powder of metal oxides such as barium titanate by compressing and calcining, for example.

The ultrasound transferring member 4, which is made of a material different from that of the housing 2, can be positioned at a substantial middle of the bottom 3 of the housing 2 in such a manner that the ultrasound transferring member 4 contacts both the bumper 11 and the piezoelectric vibrator 1. For example, the bottom 3 of the housing 2 can be provided with a through hole, and the ultrasound transferring member 4 can be inserted in the through hole. In this case, the ultrasound transferring member 4 has a thickness which is substantially equal to that of the bottom 3 of the housing 2. The ultrasound transferring member 4 is arranged at substantially the same plane with the bottom 3 at both the side of the piezoelectric vibrator 1 and the side of the bumper 11.

According to this embodiment, the housing 2 and the ultrasound transferring member 4 can be respectively made of materials (e.g., resin materials) which are different from each other. Alternatively, the housing 2 and the ultrasound transferring member 4 can be made of the same base material (e.g., resin material), on condition that only one of the housing 2 and the ultrasound transferring member 4 is provided with the glass cloth or the like.

The material and the shape of the ultrasound transferring member 4 are set so that an acoustic impedance of the ultrasound transferring member 4 has a medium value between those of the piezoelectric vibrator 1 and the bumper 11. For example, the acoustic impedance of the ultrasound transferring member 4 can have a substantial midpoint value between those of the piezoelectric vibrator 1 and the bumper 11.

A vibration absorbing member 6 is arranged in the housing 2, and surrounds the piezoelectric vibrator 1 except the surface of the piezoelectric vibrator 1 which faces the bottom 3 of the housing 2. The vibration absorbing member 6 can be constructed of an elastic material such as a polyurethane, or a rubber made of a silicon or the like, to restrict the vibration excited by the piezoelectric vibrator 1 from being transferred to portions other than ultrasound transferring member 4 and the bottom 3 of the housing 2. In this case, a stopper 7 is arranged in the housing 2 to fix the vibration absorbing member 6.

The circuit board 9 is connected with the piezoelectric vibrator 1 through lead wires 5. When a driving signal is outputted from the circuit board 9 to the piezoelectric vibrator 1, the piezoelectric vibrator 1 is vibration-excited in a vibration direction thereof to generate ultrasound.

Moreover, the circuit board 9 is provided with a processing circuit. The processing circuit executes, for example, calculation of a distance between the vehicle and the obstacle, based on ultrasound signals which are sent and received by the piezoelectric vibrator 1. That is, when the ultrasound (which is sent by piezoelectric vibrator 1 and reflected by obstacle) is received by the piezoelectric vibrator 1 so that the piezoelectric vibrator 1 is deformed, a voltage signal will be generated by the piezoelectric vibrator 1 due to a piezoelectric effect and inputted to the processing circuit. Thus, the distance between the vehicle and the obstacle, and the like can be calculated by the processing circuit, based on the time elapsed from the sending of the ultrasound to the receiving of the ultrasound.

The circuit board 9 is fixed in the housing 2 at a predetermined position, by a spacer 8. The processing circuit of the circuit board 9 is connected by a connecter 10 with, for example, a control unit (not shown) which is arranged in a passenger compartment of the vehicle to perform an informing process (for informing existence of obstacle) and the like.

Next, the mounting of the ultrasound sensor 100 to the bumper 11 will be described.

As shown in FIG. 1, the bumper 11 has a protrusion portion 11a, which protrudes from the back surface of the bumper 11 toward the inner side of the vehicle. In this case, the housing 2 is held by the protrusion portion 11a which is positioned at the back side of the bumper 11. That is, the outer surface of the housing 2 contacts the inner surface (at side of housing 2) of the protrusion portion 11a of the bumper 11. The protrusion portion 11a has a notch which is concave from the outer surface thereof toward the side of the housing 2.

In this case, the protrusion portion 11a can be provided for the whole circumference of the housing 2. That is, the whole housing 2 of the ultrasound sensor 100 can be surrounded by the protrusion portion 11a and contact therewith.

Alternatively, the protrusion portion 11a can be provided for a partial circumference of housing 2. In this case, housing 2 partially contacts multiple protrusions 11a (e.g., three protrusions) which are separately arranged at the back surface of bumper 11.

In mounting the ultrasound sensor 100, the position of ultrasound sensor 100 is determined in such a manner that bottom 3 of housing 2 contacts bumper 11 within the range surrounded by protrusion portion 11a. Then, a cover 12 is mounted to cover housing 2. The cover 12 is hollowed and bottomed. The cover 12 has an opening side and a bottom side which are opposite to each other. The housing 2 in which the piezoelectric vibrator 1 and the circuit board 9 and the like have been housed is arranged in the space defined in cover 12.

The cover 12 has a convex portion 12a, which is positioned at the end of the opening side thereof and arranged at the inner surface of the end thereof. The convex portion 12a of the cover 12 is engaged with the notch formed at the protrusion portion 11a which protrudes from the back surface of the bumper 11. Thus, the ultrasound sensor 100 is fixedly supported at the back surface of the bumper 11, with the bottom 3 of the housing 2 contacting the back surface of the bumper 11.

Next, operation of ultrasound sensor 100 will be described. When a driving signal from the processing circuit of circuit board 9 is sent to piezoelectric vibrator 1, piezoelectric vibrator 1 will have a deformation due to a dielectric polarization so that piezoelectric vibrator 1 vibrates in the thickness direction thereof (vibration direction) to generate ultrasound.

The ultrasound is transferred to bumper 11 through ultrasound transferring member 4 and bottom 3 of housing 2, to be sent toward the exterior of the vehicle. On the other hand, when piezoelectric vibrator 1 is vibration-excited by ultrasound transferred thereto through bumper 11 and ultrasound transferring member 4 and bottom 3 of housing 2, piezoelectric vibrator 1 will generate a voltage signal due to the piezoelectric effect. The voltage signal is outputted to the processing circuit through lead wires 5.

According to this embodiment, when ultrasound is received/sent by piezoelectric vibrator 1, the amount of ultrasound transferred at ultrasound transferring member 4 is larger than that at bottom 3 of housing 2.

Generally, in the case where ultrasound is transferred and reflected between components having different acoustic impedances, the reflection amount of ultrasound (i.e., amount of ultrasound not being successfully transferred outwardly) will increase when the difference between the acoustic impedances becomes large.

As described above, ultrasound transferring member 4 is provided with an acoustic impedance having a value which lies substantially halfway between those of bumper 11 and piezoelectric vibrator 1. Thus, the amount of ultrasound reflection between piezoelectric vibrator 1 and ultrasound transferring member 4, and that between ultrasound transferring member 4 and bumper 11 of the vehicle are efficiently decreased. Therefore, the desired ultrasound transfer amount is increased.

On the other hand, because stiffness and the like of housing 2 are to be maintained for a fixing piezoelectric vibrator 1 to housing 2 and for mounting housing 2 to bumper 11, it is difficult to construct housing 2 with material having an optimal characteristic for transferring ultrasound.

As a result, the acoustic impedance of bottom 3 (of housing 2) which is constructed of the material of housing 2 and positioned around ultrasound transferring member 4 will be beyond the range defined between the acoustic impedance of piezoelectric vibrator 1 and that of bumper 11. Moreover, even when the acoustic impedance of bottom 3 is within the range defined between the acoustic impedance of piezoelectric vibrator 1 and that of bumper 11, the acoustic impedance of bottom 3 will approach one of the acoustic impedances of piezoelectric vibrator 1 and bumper 11 to thus present a large difference from the other.

Thus, ultrasound reflection at bottom 3 (which is constructed of material of housing 2) increases as compared with that at ultrasound transferring member 4. Therefore, the ultrasound transfer amount at bottom 3 of housing 2 becomes smaller than that at ultrasound transferring member 4.

According to this embodiment, because ultrasound transferring member 4 is constructed of a different material from that of housing 2, the acoustic impedance of ultrasound transferring member 4 can further approach a midpoint value between the acoustic impedance of piezoelectric vibrator 1 and that of the bumper 11, than the acoustic impedance of housing 2 does.

Therefore, as described above, when ultrasound is sent and received by piezoelectric vibrator 1, the transferring of ultrasound is performed mainly via ultrasound transferring member 4. Therefore, the main transfer range of ultrasound at bumper 11 can be substantially limited at the range corresponding to ultrasound transferring member 4. Accordingly, the vibration portion of bumper 11 which is excited by ultrasound can be reduced. Thus, directivity of ultrasound sensor 100 can be restricted from becoming excessively narrow and becoming irregular. Accordingly, ultrasound sensor 100 can be provided with directivity having a desirable expanse.

Figure 2A:
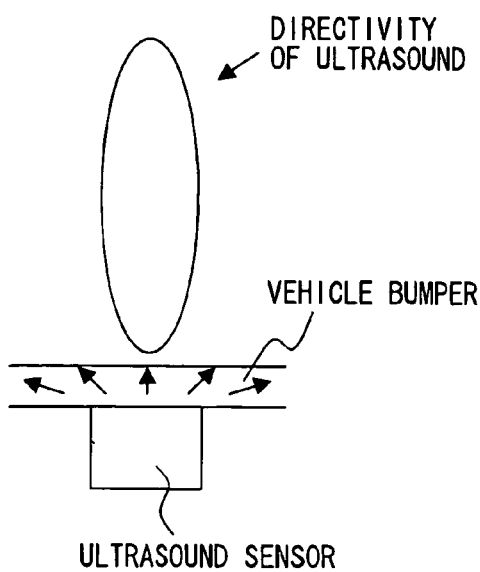
FIG. 2A is a schematic view showing a directivity of an ultrasound sensor when a vehicle bumper has a relatively broad vibration region according to a comparison example.

FIG. 2A shows an ultrasound sensor as a comparison example with the ultrasound sensor 100 according to this embodiment. Referring to FIG. 2A, when ultrasound from the ultrasound sensor is transferred to the vehicle bumper in a relatively large range, the usable directivity of the ultrasound sensor is narrowly focused and becomes irregular. That is, in the case where the vibration portion of the vehicle bumper excited by the ultrasound is large, the vibration at the different positions of the vehicle bumper will be canceled out or interfered with by each other because the vibration has different phases at different positions.

Figure 2B:
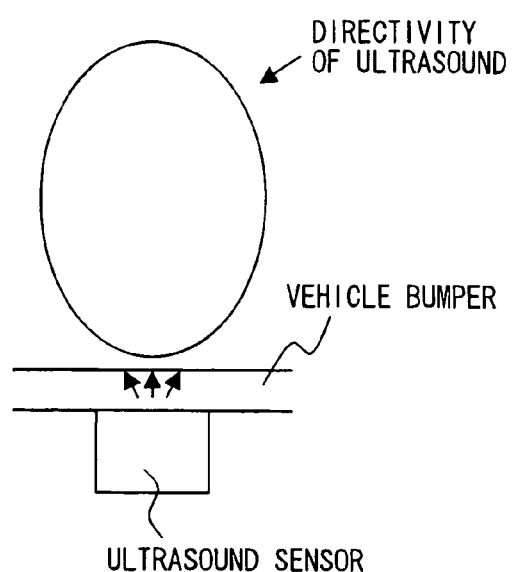
FIG. 2B is a schematic view showing a directivity of the ultrasound sensor when the vehicle bumper has a relatively narrow vibration region according to the first embodiment.

On the other hand, as shown in FIG. 2B, in the case where the vibration portion of the vehicle bumper excited by ultrasound from the ultrasound sensor (e.g., ultrasound sensor 100 described in this embodiment) becomes small, the above-described interference and the like can be restricted so that relatively extensive directivity can be provided.

As shown in FIG. 1, in this embodiment, the end surface of ultrasound transferring member 4 is smaller than the end surface of piezoelectric vibrator 1. The end surface of ultrasound transferring member 4 faces the end surface of piezoelectric vibrator 1, which is substantially perpendicular to the thickness direction of piezoelectric vibrator 1. Furthermore, ultrasound transferring member 4 is mounted to bottom 3 of housing 2, in such a manner that the whole end surface of ultrasound transferring member 4 contacts a part of the end surface of piezoelectric vibrator 1.

Therefore, when ultrasound is sent/received by piezoelectric vibrator 1, ultrasound can be efficiently transferred between piezoelectric vibrator 1 and ultrasound transferring member 4. Moreover, the ultrasound transfer range at bumper 11 can be set to have a directivity, substantially independently of the dimension of the end surface of piezoelectric vibrator 1.

Second Embodiment

Figure 3:
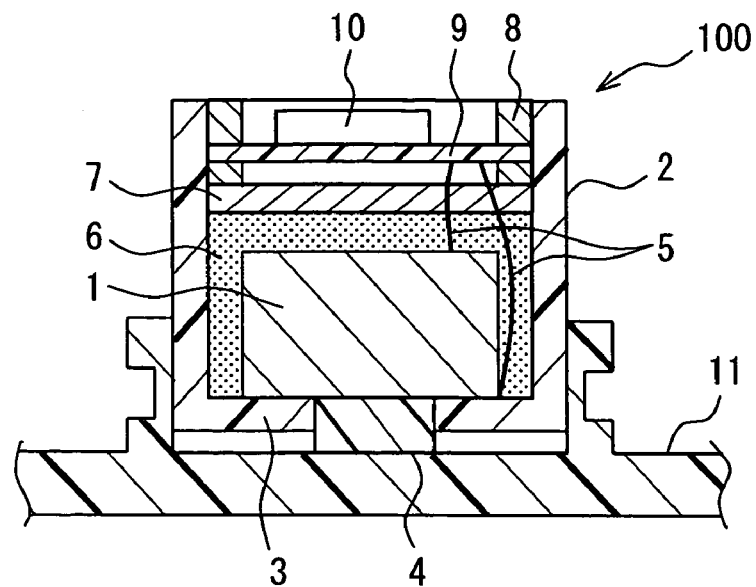
FIG. 3 is a partially sectional view showing a construction of an ultrasound sensor according to a second embodiment of the present invention.

According to a second embodiment of the present invention, as shown in FIG. 3, ultrasound transferring member 4 has a larger thickness than bottom 3 of housing 2. In this case, ultrasound transferring member 4 protrudes toward the side of bumper 11 from bottom 3 to contact the inner surface of bumper 11, and is arranged at substantially the same plane with bottom 3 at the side of piezoelectric vibrator 1. That is, piezoelectric vibrator 1 contacts both ultrasound transferring member 4 and bottom 3. The bottom 3 is constructed of the same material as housing 2 and is positioned around ultrasound transferring member 4.

In this embodiment, a gap is arranged between the outer surface of bottom 3 of housing 2 and bumper 11. That is, an end surface of ultrasound transferring member 4 is positioned at the further outer side (with respect to inner side of housing 2) than the outer surface of bottom 3.

Therefore, ultrasound transfer amount at bottom 3 can be further reduced. Therefore, ultrasound transfer between housing 2 and bumper 11 can be substantially restricted to ultrasound transferring member 4.

About ultrasound sensor 100, what has not been described in the second embodiment is the same with the first embodiment.

Third Embodiment

Figure 4:
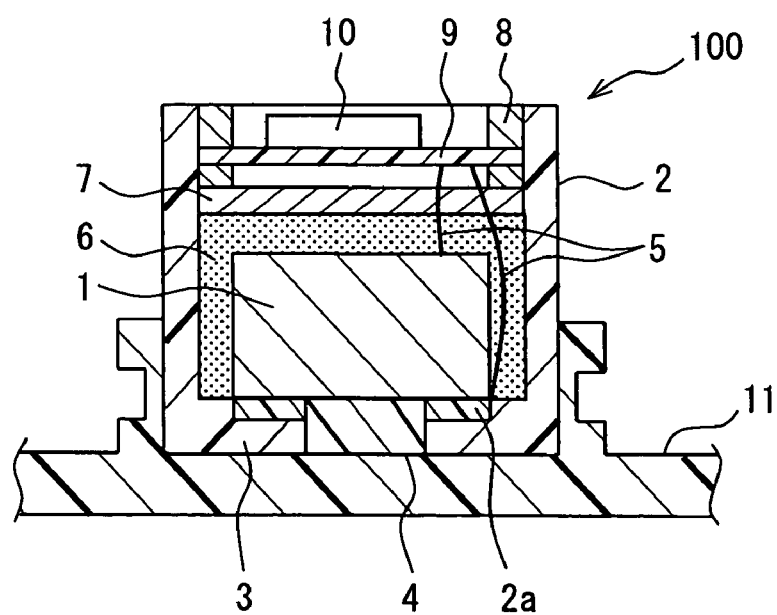
FIG. 4 is a partially sectional view showing a construction of an ultrasound sensor according to a third embodiment of the present invention.

According to a third embodiment of the present invention, as shown in FIG. 4, ultrasound transferring member 4 has a larger thickness than bottom 3 of housing 2. The ultrasound transferring member 4 protrudes toward the side of piezoelectric vibrator 1 from bottom 3, and is arranged at substantially the same plane as bottom 3 at the side of bumper 11. That is, bumper 11 contacts both ultrasound transferring member 4 and bottom 3. The bottom 3 is constructed of the same material as housing 2 and is positioned around ultrasound transferring member 4, for example.

In this embodiment, piezoelectric vibrator 1 is isolated from bottom 3 of housing 2, by an ultrasound attenuating portion 2a which is made of a material having an ultrasound attenuation coefficient larger than that of the material of housing 2. For example, ultrasound attenuating portion 2a can be made of a rubber, or an elastomer or the like which greatly attenuates ultrasound transferred therein.

With reference to FIG. 4, ultrasound attenuating portion 2a can be arranged, for example, at a concave portion formed at bottom 3 of housing 2 and positioned around ultrasound transferring member 4, to cover at least the range of bottom 3 between piezoelectric vibrator 1 and bottom 3. Therefore, ultrasound can be restricted from being directly transferred from piezoelectric vibrator 1 to bottom 3 of housing 2.

That is, ultrasound transfer between housing 2 and bumper 11 can be substantially restricted to ultrasound transferring member 4, even when ultrasound transferring member 4 is arranged at substantially the same plane with ultrasound attenuating portion 2a at the side of piezoelectric vibrator 1.

In this case, ultrasound attenuating portion 2a can be arranged at the concave portion formed at bottom 3 of housing 2. That is, the thickness of ultrasound attenuating member 2a is smaller than that of bottom 3.

Alternatively, ultrasound attenuating member 2a can be also arranged at a through hole formed at bottom 3 of housing 2. That is, ultrasound attenuating member 2a can be provided with thickness substantially equal to that of bottom 3.

About ultrasound sensor 100, what has not been described in the third embodiment is the same as with the first embodiment.

Other Embodiments

Although the present invention has been fully described in connection with three embodiments thereof with reference to accompanying drawings, it is to be noted that various changes and modifications will become apparent to those skilled in the art.

In the above-described embodiments, a single ultrasound vibrator 1 is provided to send and receive ultrasound. However, two ultrasound vibrators can be also provided to respectively send ultrasound and receive ultrasound.

Moreover, in the above-described embodiments, ultrasound sensor 100 is fixed to the back surface (i.e., surface of vehicle inner side) of bumper 11 by snap-fitting. However, ultrasound sensor 100 can be also fixed by bonding, or screw-fastening or the like.

Furthermore, ultrasound sensor 100 in the exemplary embodiments has circuit board 9 where a processing circuit is arranged. However, the processing circuit can be also arranged separately from ultrasound sensor 100.

Moreover, ultrasound sensor 100 can be also mounted to a vehicle inner side of a periphery member of the vehicle other than bumper 11. In this case, ultrasound sensor 100 can be provided with a mounting portion made of a resin, for example.

Furthermore, ultrasound sensor 100 can be also used for a device other than a vehicle. In this case, housing 2 can be fixed to a side of a base member of the device. The ultrasound vibrator 1 is housed in housing 2, to send ultrasound to an opposite side of the base member and to receive ultrasound from the opposite side.

Such changes and modifications are to be understood as being within the scope of the present invention as defined by the appended claims.

What is claimed is:

1. An ultrasound sensor, comprising:
   a housing which is fixedly arranged at inner side of a periphery member of a vehicle;
   an ultrasound vibrator for sending and receiving ultrasound, the ultrasound vibrator being accommodated in the housing and fixed to an end portion of the housing, the end portion facing the periphery member; and
   an ultrasound transferring member which is arranged at the end portion of the housing and contacts both the ultrasound vibrator and the periphery member of the vehicle, wherein
   the ultrasound transferring member is constructed of a different material from that of the housing to have an acoustic impedance with a medium value between an acoustic impedance of the ultrasound vibrator and that of the periphery member, the ultrasound being sent and received through the ultrasound transferring member and the periphery member of the vehicle.

2. The ultrasound sensor according to claim 1, wherein
   the acoustic impedance of the ultrasound transferring member further approaches a midpoint value between the acoustic impedance of the ultrasound vibrator and that of the periphery member of the vehicle, more closely than an acoustic impedance of the end portion of the housing does.

3. The ultrasound sensor according to claim 1, wherein
   the ultrasound transferring member and the ultrasound vibrator contact each other respectively at end surfaces thereof,
   the end surface of the ultrasound transferring member being smaller than the end surface of the ultrasound vibrator, and the whole end surface of the ultrasound transferring member contacting a part of the end surface of the ultrasound vibrator.

4. The ultrasound sensor according to claim 1, wherein
   the ultrasound transferring member protrudes out of the end portion of the housing toward a side of the periphery member of the vehicle, to contact the periphery member at a protrusion end surface of the ultrasound transferring member.

5. The ultrasound sensor according to claim 1, further comprising
   an ultrasound attenuating member which is constructed of a different material from that of the housing to have a larger ultrasound attenuation coefficient than the material of the housing, wherein
   the ultrasound attenuating member is arranged in the housing and positioned between the ultrasound vibrator and the end portion of the housing, where the ultrasound transferring member is mounted.

6. The ultrasound sensor according to claim 5, wherein
the ultrasound attenuating member is arranged at the end portion of the housing at least at a range to isolate an end surface of the ultrasound vibrator from the end portion of the housing, the end surface of the ultrasound vibrator facing the end portion of the housing.

7. The ultrasound sensor according to claim 1, wherein
the periphery member is a bumper of the vehicle.

8. An ultrasound sensor, comprising:
a housing which is fixed to a side of a base;
an ultrasound vibrator for sending ultrasound to an opposite side of the base and for receiving ultrasound from the opposite side,
the ultrasound vibrator being accommodated in the housing and fixed to an inner surface of an end portion of the housing with a vibration direction of the ultrasound vibrator being substantially perpendicular to the inner surface, the end portion of the housing facing the base; and
an ultrasound transferring member which is arranged at the end portion of the housing and contacts both the ultrasound vibrator and the base, wherein
the ultrasound transferring member is constructed of a different material from that of the housing to have an acoustic impedance with a predetermined value.

9. The ultrasound sensor according to claim 8, wherein
the acoustic impedance of the ultrasound transferring member further approaches a midpoint value between an acoustic impedance of the ultrasound vibrator and that of the base, more closely than an acoustic impedance of the end portion of the housing does.

10. The ultrasound sensor according to claim 8, wherein:
the ultrasound transferring member and the ultrasound vibrator contact each other respectively at end surfaces thereof,
the end surface of the ultrasound transferring member being smaller than the end surface of the ultrasound vibrator, and the whole end surface of the ultrasound transferring member contacting a part of the end surface of the ultrasound vibrator.

11. The ultrasound sensor according to claim 8, wherein
the ultrasound transferring member protrudes out of the end portion of the housing toward a side of the base, to contact the base.

12. The ultrasound sensor according to claim 8, further comprising
an ultrasound attenuating member which is constructed of a different material from that of the housing to have a larger ultrasound attenuation coefficient than the material of the housing, wherein
the ultrasound attenuating member is arranged in the housing and positioned between the ultrasound vibrator and the end portion of the housing.

13. The ultrasound sensor according to claim 12, wherein
the ultrasound attenuating member is arranged at the end portion of the housing to isolate an end surface of the ultrasound vibrator from the end portion of the housing, the end surface of the ultrasound vibrator facing the end portion of the housing.

* * * * *